US009141729B2

(12) United States Patent
Kawamura et al.

(10) Patent No.: US 9,141,729 B2
(45) Date of Patent: Sep. 22, 2015

(54) DISPLAY-DATA GENERATING APPARATUS AND DISPLAY-DATA GENERATING METHOD

(75) Inventors: Takahiro Kawamura, Tokyo (JP); Shinichi Nagano, Kanagawa (JP); Masumi Inaba, Kanagawa (JP); Yumiko Shimogoori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1277 days.

(21) Appl. No.: 12/388,759

(22) Filed: Feb. 19, 2009

(65) Prior Publication Data

US 2009/0213133 A1 Aug. 27, 2009

(30) Foreign Application Priority Data

Feb. 21, 2008 (JP) ................. 2008-040155

(51) Int. Cl.
G09G 5/02 (2006.01)
G06F 17/00 (2006.01)
G06F 17/30 (2006.01)
G06T 11/20 (2006.01)

(52) U.S. Cl.
CPC ........ G06F 17/30994 (2013.01); G06T 11/206 (2013.01)

(58) Field of Classification Search
CPC ................. G06T 11/206; G06F 17/30994
USPC ........................................... 345/440
See application file for complete search history.

(56) References Cited

U.S. PATENT DOCUMENTS

| 7,681,131 | B1* | 3/2010 | Quarterman et al. | .......... 715/736 |
| 2005/0283377 | A1* | 12/2005 | Nagano et al. | .................... 705/1 |
| 2008/0174603 | A1* | 7/2008 | Brass et al. | ................... 345/501 |
| 2008/0215571 | A1* | 9/2008 | Huang et al. | ...................... 707/5 |
| 2009/0070679 | A1* | 3/2009 | Shen et al. | ..................... 715/733 |
| 2009/0076994 | A1* | 3/2009 | Ghosh et al. | .................... 706/46 |
| 2009/0083261 | A1 | 3/2009 | Nagano et al. | |

FOREIGN PATENT DOCUMENTS

| JP | 2002-024283 |   | 1/2002 |
| JP | 2002-24283 | * | 1/2002 |
| JP | 2004-192399 | * | 7/2004 |

(Continued)

OTHER PUBLICATIONS

Japanese Patent Office Search Report with English translation, 2012, 9 total pages.*

(Continued)

Primary Examiner — Jeffery A Brier
(74) Attorney, Agent, or Firm — Amin, Turocy & Watson, LLP

(57) ABSTRACT

A display-data generating apparatus obtains reputation information indicative of reputation of a subject and extracted from a text accessible via a network, and linkage information indicative of a linkage between texts, and couples the reputation information and the linkage information to obtain the linkage between the texts associated with the reputation information specified from each of the texts. The display-data generating apparatus determines a display mode of a first mark that symbolizes the text and a second mark that symbolizes the linkage based on the reputation information corresponding to the text, and generates a display data to display the first mark and the second mark in the determined display mode.

20 Claims, 9 Drawing Sheets

(56) References Cited

FOREIGN PATENT DOCUMENTS

| JP | 2005-107866 | * | 4/2005 |
| JP | 2005-339419 | * | 12/2005 |
| JP | 2006-092354 | | 4/2006 |
| JP | 2007-188330 | | 7/2007 |

OTHER PUBLICATIONS

Japanese Patent Office Notification of Reasons for Refusal with English translation, 2012, 6 total pages.*

On-line news article, "The Crossing Warp Has Made the Spread Tree by Word of Mouth Visible," http://business.nikkeibp.co.jp/article/nmg/20070928/136360/?ST=nmg_page, Mar. 4, 2009.

Yahoo! Japan Reputation Search, http://blog-search.yahoo.co.jp/repu?p=%E6%9D%B1%E8%8A%9D&ei=utf-8, Aug. 7, 2008.

Japanese Office Action for Application No. 2008-040155 Mailed on Apr. 17, 2012.

Sho Ishikawa et al.; Visualization of topic in trackback structure of Weblog, the collection (1) of speeches and papers in the 69th convention (2007), Architecture, software science and software engineering, Database and Media, Japan, Information Processing Society of Japan, Mar. 6, 2007, pp. 1-371 to 1-372.

* cited by examiner

DISPLAY-DATA GENERATING APPARATUS AND DISPLAY-DATA GENERATING METHOD

CROSS-REFERENCE TO RELATED APPLICATIONS

This application is based upon and claims the benefit of priority from the prior Japanese Patent Application No. 2008-40155, filed on Feb. 21, 2008; the entire contents of which are incorporated herein by reference.

BACKGROUND OF THE INVENTION

1. Field of the Invention

The present invention relates to a technology for generating display data so that a user can easily recognize the display data.

2. Description of the Related Art

Many attempts have been made to extract reputation information that indicates Word-of-Mouth information on a predetermined commercial product name or a predetermined subject from texts posted on a website such as a blog or a social network service (see, for example, JP-A 2007-188330 (KOKAI)). Conventionally, the extracted reputation information is displayed as the reputation of the predetermined subject, for example, in the form of values or a bar graph indicative of the numbers or proportions of positive opinion and negative opinion in the predetermined viewpoint, or in the form of a line graph indicative of the temporal change of the values.

On the other hand, in these years, there are proposed technologies of displaying linkages among websites linked by hyperlinks embedded in the websites (see, for example, JP-A 2006-92354 (KOKAI)).

With such a technology as disclosed in JP-A 2006-92354 (KOKAI), a user can view the linkages among the websites in two dimensions, whereby the user can easily understand the linkages by sight. However, the reputation information extracted from the websites can be viewed in only one dimension, and therefore it is desired to make it easier for the user to recognize the reputation information shared among the websites by sight.

SUMMARY OF THE INVENTION

According to one aspect of the present invention, a display-data generating apparatus includes a first obtaining unit that obtains reputation information indicative of reputation of a subject, the reputation information being extracted from a text accessible via a network, a second obtaining unit that obtains linkage information indicative of a linkage between texts, a coupling unit that couples the reputation information and the linkage information, thereby obtaining the linkage between the texts associated with the reputation information specified from each of the texts, a determining unit that determines a display mode of a first mark that symbolizes the text and a second mark that symbolizes the linkage based on the reputation information corresponding to the text, and a generating unit that generates a display data to display the first mark and the second mark in the display mode determined by the determining unit.

According to another aspect of the present invention, a display-data generating method includes firstly obtaining reputation information indicative of reputation of a subject, the reputation information being extracted from a text accessible via a network, secondly obtaining linkage information indicative of a linkage between texts, coupling the reputation information and the linkage information, thereby obtaining the linkage between the texts associated with the reputation information specified from each of the texts, determining a display mode of a first mark that symbolizes the text and a second mark that symbolizes the linkage based on the reputation information corresponding to the text, and generating a display data to display the first mark and the second mark in the display mode determined in the determining.

DETAILED DESCRIPTION OF THE PREFERRED EMBODIMENTS

Exemplary embodiments of the present invention are described in detail below with reference to the accompanying drawings. The present invention is not limited to the embodiments, and various modifications can be made without departing from the scope of the invention.

A display-data generating apparatus 100 according to a first embodiment of the present invention includes a control device, such as a central processing unit (CPU), that controls the entire apparatus, an internal storing device, such as a read only memory (ROM) and a random access memory (RAM), that stores therein various types of data and programs, an external storing unit, such as a hard disk drive (HDD) and a compact disk (CD), that also stores therein various types of data and programs, and a bus that connects the devices one another. The display-data generating apparatus 100 can be a typical computer. The display-data generating apparatus 100 is connected to a display unit (not shown) that displays information, an input device (not shown) that receives directions input by a user, and a communication interface (I/F) with or without wires.

Figures 1, 2:
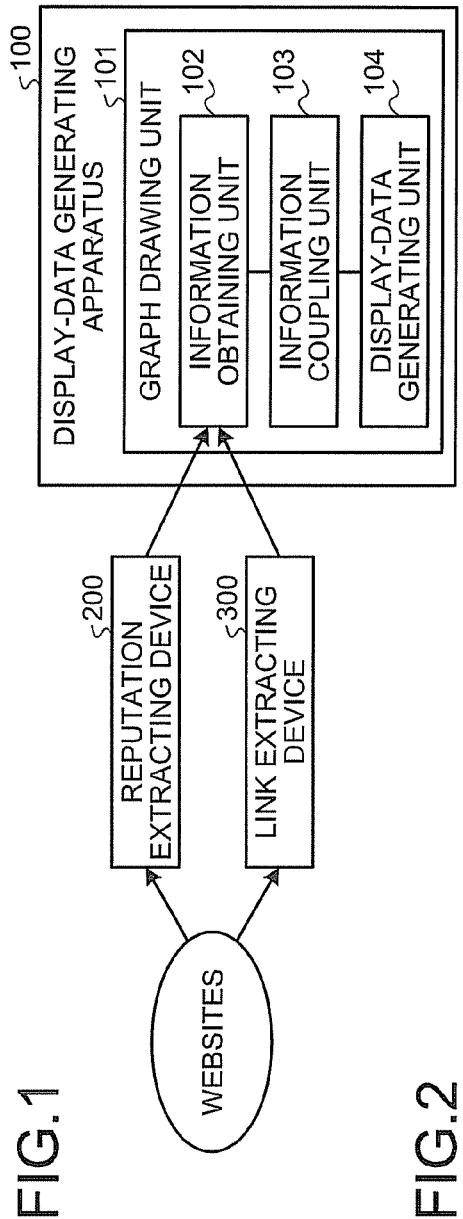
FIG. 1 is a block diagram of a display-data generating apparatus according to a first embodiment of the present invention.
FIG. 2 is an example of a data configuration of reputation information obtained by an information obtaining unit shown in FIG. 1.

Given below are explanations of functions realized in the display-data generating apparatus 100 by the CPU executing the programs stored in the internal storing device or the external storing device. The programs stored in the internal storing device and the external storing device include both program codes and various types of data used when the program codes are executed. FIG. 1 is a block diagram of the display-data generating apparatus 100. Units shown in FIG. 1 are generated on the internal storing unit when the CPU executes the programs. The display-data generating apparatus 100 includes a graph drawing unit 101 that draws a graph, and the graph drawing unit 101 further includes an information obtaining unit 102, an information coupling unit 103, and a display-data generating unit 104.

The information obtaining unit 102 is connected to a reputation extracting device 200 that extracts reputation information and a link extracting device 300 that extracts linkages among websites via a network (not shown). The network can be, for example, a local area network (LAN), an intranet, Ethernet®, or an internet. The information obtaining unit 102 obtains the reputation information from the reputation extracting device 200, and, at the same time, obtains linkage information indicative of the linkages among the websites from the link extracting device 300.

The reputation extracting device 200 extracts the reputation of a predetermined commercial product name or a predetermined subject by performing a natural language processing or a statistical processing based on word frequency, and sends the reputation information indicative of the reputation to the display-data generating apparatus 100. The reputation extracting device 200 can use any method to extract the reputation information, such as a method disclosed in JP-A 2007-188330 (KOKAI).

FIG. 2 is an example of a data configuration of the reputation information obtained by the information obtaining unit 102. As shown in FIG. 2, the reputation information includes an article number, a author, a subject, a text content, a positive score and a negative score determined based on the text content, a title, a viewpoint, and a uniform resource locator (URL). The article number is an identifier that uniquely identifies a piece of the reputation information. The author is a name, such as a handle name, that identifies a person who posted the text to a website. The subject is the commercial product name or the subject, about which the text is written. The positive score indicates a degree of positive reputation, which is computed from an impact of a positive expression included in the text and the number of times that the expression appeared in the text. The negative score indicates a degree of negative reputation, which is computed from an impact of a negative expression included in the text and the number of times that the expression appeared in the text. The viewpoint indicates a standpoint in which the subject is evaluated, such as "function" and "design". The title is a heading of the text given by the author. The text content is a body of the text from which the reputation information is extracted.

The link extracting device 300 can use any method to extract the linkages among the websites, such as a method disclosed in JP-A 2006-92354 (KOKAI). A linkage between websites can be identified by, for example, a hyperlink, a track back in a blog, and a footprint left by a visitor in a social network service (SNS). In the case of the hyperlink, the linkage information is extracted using a website indicated by the hyperlink as a link destination, and a website that includes the hyperlink as a link origin. In the case of the track back, the linkage information is extracted using a tracked-back blog as the link destination, and a website that tracks back the blog as the link origin. In the case of the footprint, the linkage information is extracted using a website in which the footprint is left as the link destination, and a website that left the footprint as the link origin. The destination and the link origin can be switched, or websites can be both the destination and the origin. For example, the linkage information herein includes the URL of the websites, and it is expressed by a vector that directionally expresses the linkage between the websites.

Figure 3:
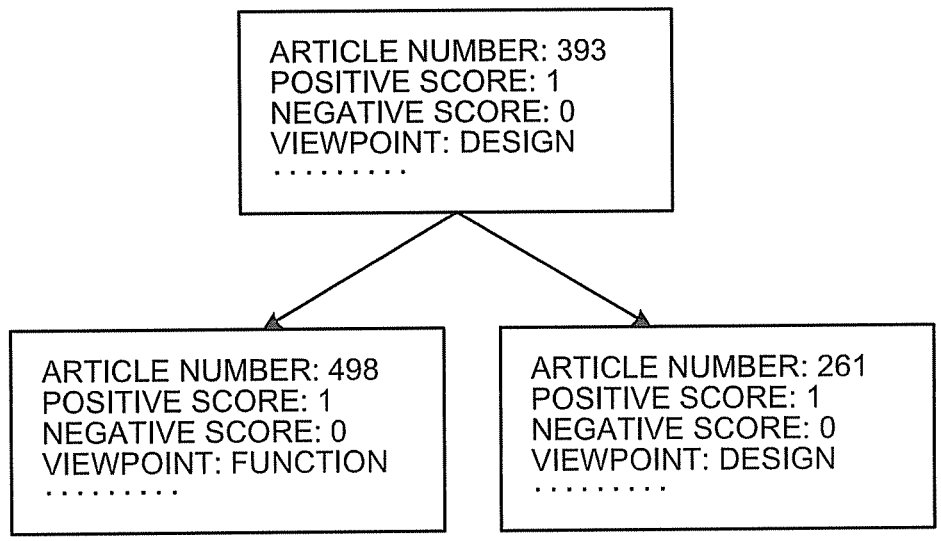
FIG. 3 is a schematic diagram illustrating reputation linkage information according to the first embodiment.

The information coupling unit 103 assembles the reputation information and the linkage information obtained by the information obtaining unit 102. The reputation information and the linkage information are coupled, for example, based on the URL. More specifically, each website is assumed as a node in the linkages among the websites expressed by the linkage information, and the information coupling unit 103 associates the reputation information that directionally indicates the linkage and that includes a URL identical to the URL in the linkage information with the node, thereby generating the reputation linkage information that indicates the linkages among the websites associated with the reputation information identified by each website. FIG. 3 is a schematic diagram illustrating the reputation linkage information. In FIG. 3, the linkages among the websites associated with the reputation information as shown in FIG. 2 are indicated by arrows.

The display-data generating unit 104 determines display modes of a mark of the website, i.e., the node (hereinafter referred to as "first mark"), and a mark of the linkage (hereinafter referred to as "second mark"), based on the reputation linkage information obtained by the information coupling unit 103. The display mode includes a color, a color density, a thickness of a line, a display position, and a display size. The display-data generating unit 104 generates display data to display the first mark of the node and the second mark of the linkage on the display unit. As a result, the display data that plots a propagation of the reputation is generated.

Figure 4:
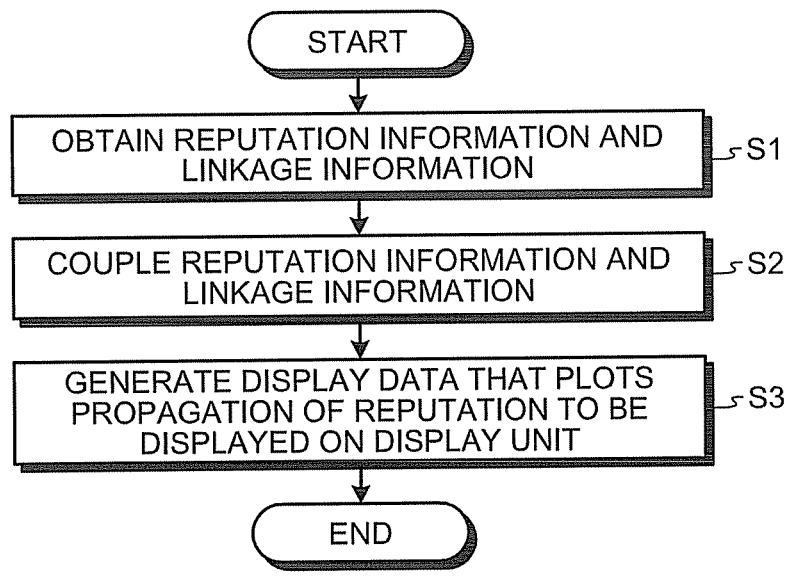
FIG. 4 is a flowchart of a display-data generating process according to the first embodiment.

A display-data generating process performed by the display-data generating apparatus 100 is explained with reference to FIG. 4. The information obtaining unit 102 in the display-data generating apparatus 100 obtains the reputation information from the reputation extracting device 200, and obtains the linkage information from the link extracting device 300 (Step S1). The information coupling unit 103 then couples the reputation information and the linkage information obtained by the information obtaining unit 102 to generate the reputation linkage information indicative of the linkages among the websites in which reputation information identified from each web page is associated with one another (Step S2). The display-data generating unit 104 then determines the display mode for the first mark of the node and the second mark of the linkage using the reputation linkage information obtained at Step S2, and generates the display data (Step S3).

More specifically, for example, the first mark of the node is a circle, and the second mark of the linkage is an arrow. If the positive score included in the reputation information is higher than the negative score, the display-data generating unit 104 determines that the node corresponding to the reputation information is positive data, and then specifies a color of the circle of the node, such as black. On the contrary, if the positive score included in the reputation information is lower than the negative score, the display-data generating unit 104 determines that the node corresponding to the reputation information is negative data, and then specifies another color of the circle of the node, such as white. Furthermore, the display-data generating unit 104 specifies the color of the arrow corresponding to the linkage based on the color of the link origin. For example, if the node of the link origin is positive data, the color of the arrow is black, and if the node of the link origin is negative data, the color of the arrow is made white. Moreover, the display-data generating unit 104 determines the thickness of the arrow in the following manner. The arrow is made thicker as the positive score in the reputation information associated with the positive data of the link origin or the negative score in the reputation information associated with the negative data of the link origin is higher. In this manner, the display-data generating unit 104 determines the color and the thickness of the first mark of the node and the second mark of the linkage positioned based on the reputation linkage information, thereby generating the display data.

Figure 5:
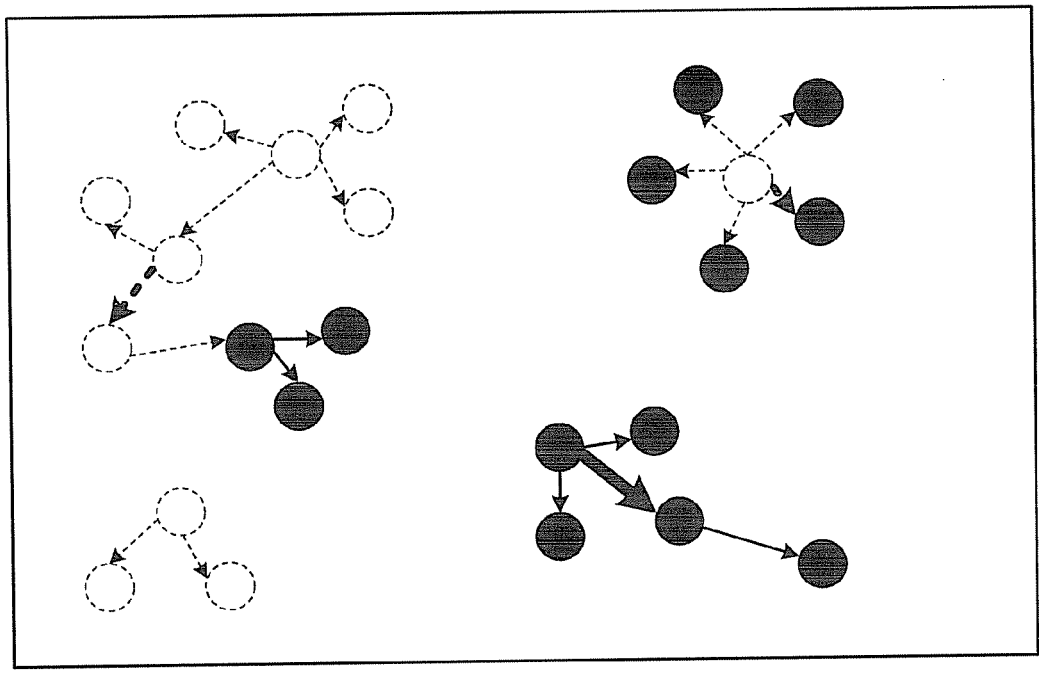
FIGS. 5 to 9 are examples of display data displayed on a display unit.

When the display data generated in this manner is displayed on the display unit, for example, the display unit displays a screen as shown in FIG. 5. In FIG. 5, the arrow from the node having the negative data is represented by a dotted line instead of a white color. With such a screen, the user can easily recognize whether the reputation is negative or positive from the color of the circle, and easily recognize the propagation of the reputation. Furthermore, the user can also easily recognize the size of the positive score and the negative score from the thickness of the arrow.

With the configuration described above, the user can easily recognize how the reputation changes during the propagation from website to website. Therefore, it is easy to analyze the reputation of the commercial product name or the subject.

Figure 6:
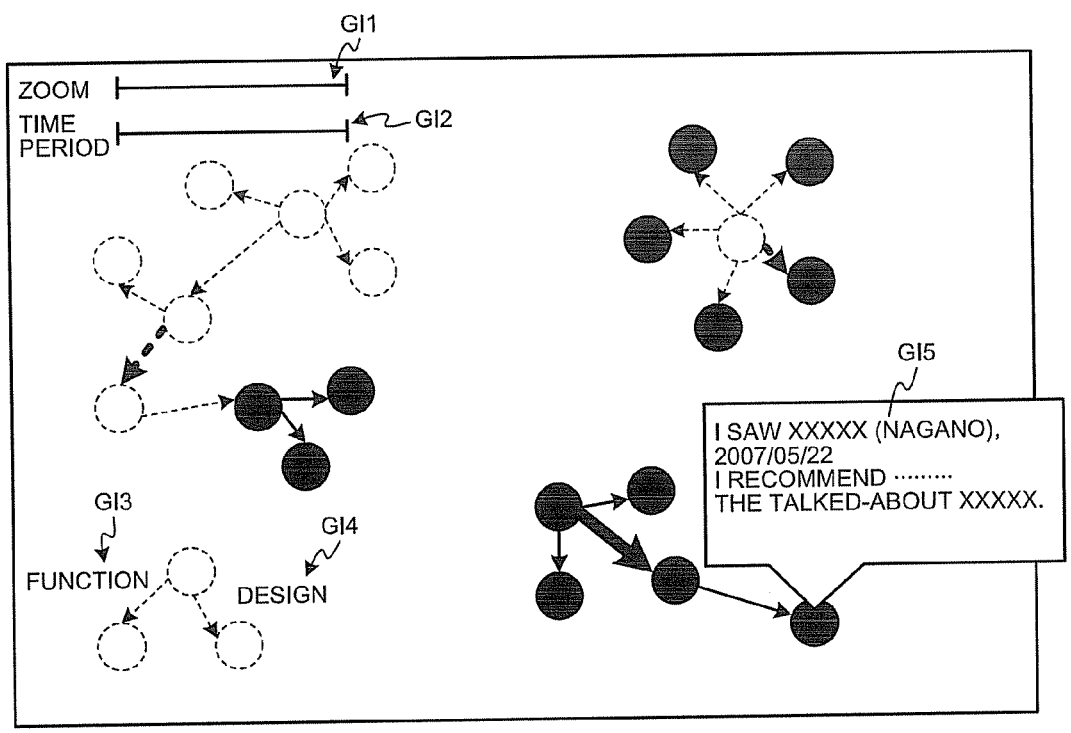

The display-data generating unit 104 can be configured to generate each piece of the display data described below on the screen as shown in FIG. 5 according to the directions input by the user through the input device. For example, with the screen as shown in FIG. 6, the user inputs a direction to zoom in or out using a scaler GI1, and the display-data generating unit 104 zooms in or out the display data.

The reputation information includes date information indicative of the date on which the text was written. In this case, in response to a direction input to specify at least one of the date of starting display or the date of terminating display, the display-data generating apparatus 100 can be configured to extract only the reputation information that includes the date information indicative of the date after the date of starting display or before the date of terminating display, and generate the display data that includes the first mark of the node and the second mark of the linkage corresponding to the extracted reputation information. Alternatively, the display-data generating apparatus 100 can be configured to, for example, when a direction is input to specify the number of days using a scaler GI2 shown in FIG. 6, extract the reputation information that includes the date information indicative of the date within the number of the days from a predetermined date, and determine the positions of the first mark of the node and the second mark of the linkage, thereby generating the display data.

Figure 7:
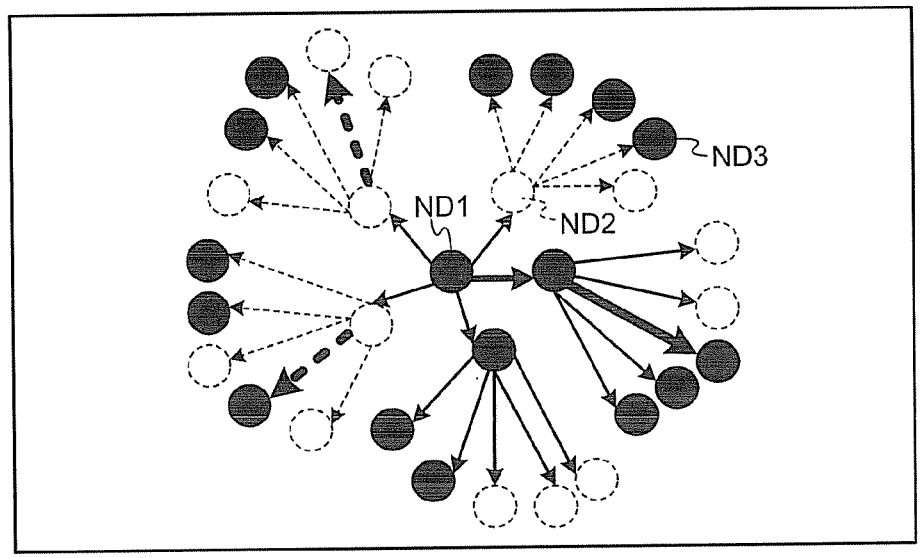

When the reputation information includes the date information, the display-data generating apparatus 100 can be configured to generate the display data by placing the node corresponding to the reputation information that includes the date information indicative of the oldest date at the center and other nodes and arrows indicative of the linkages radiated in all directions from the central node so that the nodes and arrows do not overlap with each other. FIG. 7 is an example of such display data displayed on the display unit. In FIG. 7, for example, the reputation information corresponding to a node ND1 is the oldest, the reputation information corresponding to a node ND2 is newer than the reputation information corresponding to the node ND1, and the reputation information corresponding to a node ND3 is newer than the reputation information corresponding to the node ND2.

Figure 8:
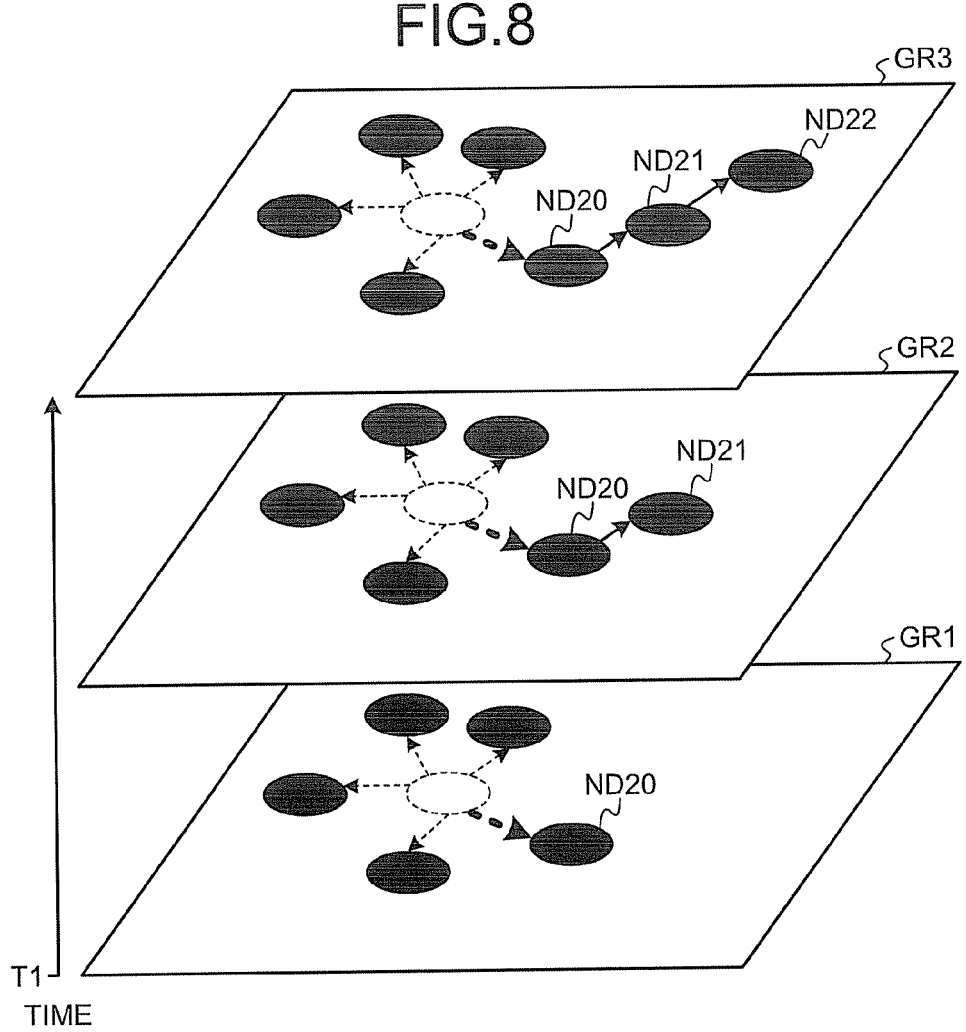

When the reputation information includes the date information, the display-data generating apparatus 100 can be configured to generate the display data so that the propagation of the reputation in the temporal order is displayed by forming layers. Specifically, the information coupling unit 103 couples the reputation information and the linkage information with respect to each time period after a predetermined time point. As a result, the reputation linkage information at each time period after the predetermined time point is obtained. The display-data generating unit 104 associates the reputation linkage information at each time period after the predetermined time point with each layer, thereby generating the display data plotting the reputation linkage information with respect to each layer. By displaying such display data with respect to each layer on the display unit, for example, a screen as shown in FIG. 8 is displayed. In FIG. 8, layers GR1, GR2, and GR3 indicate graphs plotting the reputation linkage information in the temporal order after a time point T1. FIG. 8 indicates that the reputation propagates from a node symbolized by ND20 in the layer GR1 to a node symbolized by ND21 in the layer GR2, and further propagates to a node symbolized by ND22 in the layer GR3. By looking at such a screen displayed on the display unit, the user can easily recognize the propagation of the reputation in the temporal order.

The display-data generating apparatus 100 can be configured to, in response to a direction input to specify the number of the nodes to be displayed, select the number of arbitrary nodes, and generate the display data including only the first marks of the selected nodes.

The display-data generating apparatus 100 can be configured to, in response to a direction input to specify the author, generate the display data including the first marks of the nodes corresponding to the reputation information that includes the specified author.

The display-data generating apparatus 100 can be configured to, categorize a plurality of websites, such as entries to blogs, based on the authors, overlap the first marks of the nodes corresponding to the websites written by the same author with the position of the first marks displaced little by little, and determine whether to use a single mark or different marks, thereby generating the display data. Furthermore, the display-data generating apparatus 100 can be configured to make the determination based on a direction input by the user through the input device.

The display-data generating apparatus 100 can be configured to generate the display data with the colors and the shapes of the arrows varied depending on the viewpoint included in the reputation information. For example, an arrow is made purple when the link origin is the node corresponding to the reputation information including "function" as the viewpoint, and the arrow is made green when the link origin is the node corresponding to the reputation information including "design" as the viewpoint. The display data can be generated so that a label, such as GI3 and GI4 shown in FIG. 6 indicative of the viewpoint, is displayed at the arrow, or so that a balloon indicative of the viewpoint is displayed at the arrow.

The display-data generating apparatus 100 can be configured to generate the display data with the shapes and the colors of the first marks of the nodes varied depending on the viewpoint included in the reputation information, instead of marking the node with the circle.

The display-data generating apparatus 100 can be configured to generate the display data that includes only the first marks of the nodes corresponding to the reputation information including a viewpoint specified by a direction and the second marks of the linkages among the nodes.

The display-data generating apparatus 100 can be configured to generate the display data that displays the title and/or the text content included in the reputation information corresponding to the node, for example, using a balloon GI5 shown in FIG. 6, according to a direction input to select a node.

The display-data generating apparatus 100 can be configured to generate the display data that includes only the first marks of the nodes corresponding to the reputation information having the positive score or the negative score higher than a predetermined value.

The display data can be generated with the color density of the arrow varied depending on the value of the positive score or the negative score instead of the thickness of the arrow, and with the size of the circle indicative of the node depending on the value of the positive score or the negative score.

Figure 9:
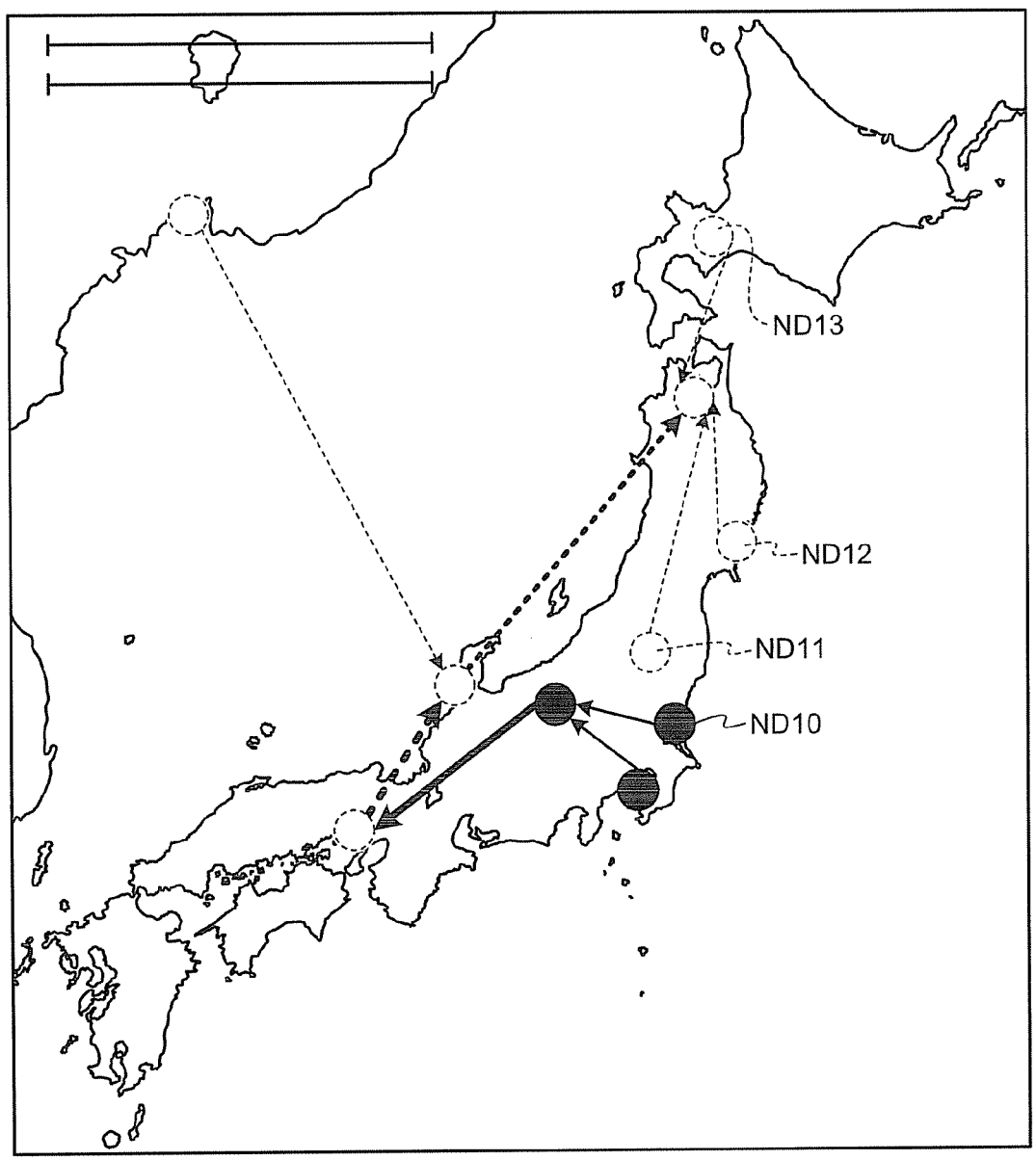

It is assumed that the reputation information includes location information indicative of a location of the author. The location information is identified by the reputation extracting device 200, for example, based on the text content and profile information of the author. For example, the text content of a travel report may include a destination of the travel, and the profile may include a living place. In this case, the display data can be generated with the first marks of the nodes arranged according to the physical locations, such as Tokyo and Osaka, on a map. FIG. 9 is an example of such display data displayed on the display unit. In FIG. 9, the map is displayed, and first marks ND10 to ND13 of the nodes are arranged on the map. With this configuration, the user can recognize geographical propagation of the reputation.

A second embodiment of the present invention is explained below. The explanation of the configuration identical to the first embodiment is not repeated, and the same reference numerals are used as in the first embodiment.

Figure 10:
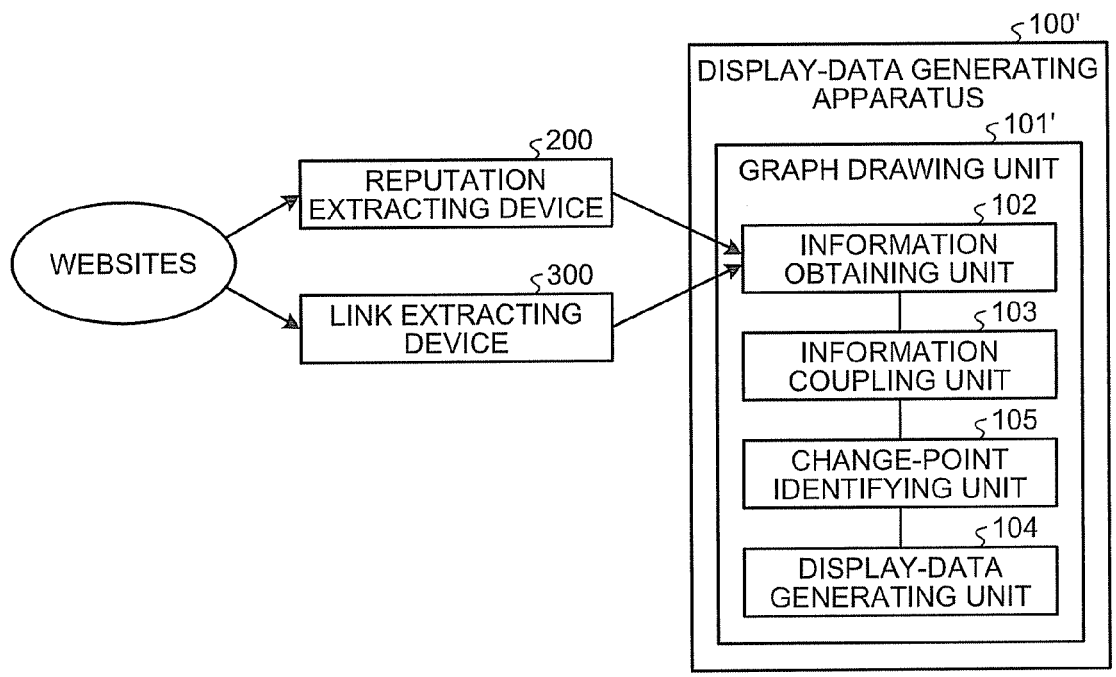
FIG. 10 is a block diagram of a display-data generating apparatus according to a second embodiment of the present invention.

FIG. 10 is a block diagram of a display-data generating apparatus 100' according to the second embodiment. The configuration of the display-data generating apparatus 100' is different from the display-data generating apparatus 100 according to the first embodiment in the following aspects. A graph drawing unit 101' in the display-data generating apparatus 100' includes a change-point identifying unit 105 in addition to the information obtaining unit 102, the information coupling unit 103, and the display-data generating unit 104. The change-point identifying unit 105 identifies a point at which the reputation greatly changes in the reputation linkage information obtained by the information coupling unit 103. In other words, the change-point identifying unit 105 identifies nodes and a link between where the change of the reputation in the reputation linkage information satisfies a predetermined condition. For example, the condition to identify the change point is predetermined and stored in an internal or external storing unit, and the change-point identifying unit 105 identifies the change point with reference to the condition. The specific condition will be explained later. The display-data generating unit 104 increases the size of the change point identified by the change-point identifying unit 105 compared with other points.

Figure 11:
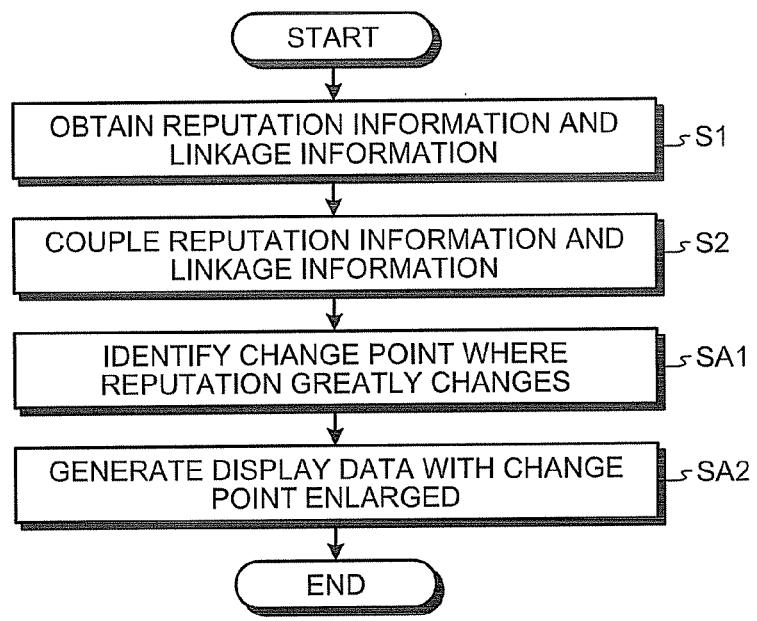
FIG. 11 is a flowchart of a display-data generating process according to the second embodiment.

A display-data generating process performed by the display-data generating apparatus 100' is explained with reference to FIG. 11. Steps S1 and S2 are same as in the first embodiment. At Step SA1, the change-point identifying unit 105 identifies the change point in the reputation linkage information obtained at Step S2 with reference to the condition stored in advance. For example, the condition can be; (a) not both of the link origin and the link destination are the positive data or the negative data, and (b) that the link origin has more than a predetermined number, such as four, of the link destinations. The case in which not both of the link origin and the link destination are the positive data or the negative data means a case in which the positive score in the reputation information corresponding to the node of the link destination is lower than the negative score and the positive score in the reputation information corresponding to the node of the link origin is higher than the negative score, or in which the positive score in the reputation information corresponding to the node of the link destination is higher than the negative score and the positive score in the reputation information corresponding to the node of the link origin is lower than the negative score. In other words, based on the condition (a), the change-point identifying unit 105 identifies the point at which the reputation changes from positive to negative or from negative to positive. Based on the condition (b), the change-point identifying unit 105 identifies the point that has a strong influence on the reputation.

Figure 12:
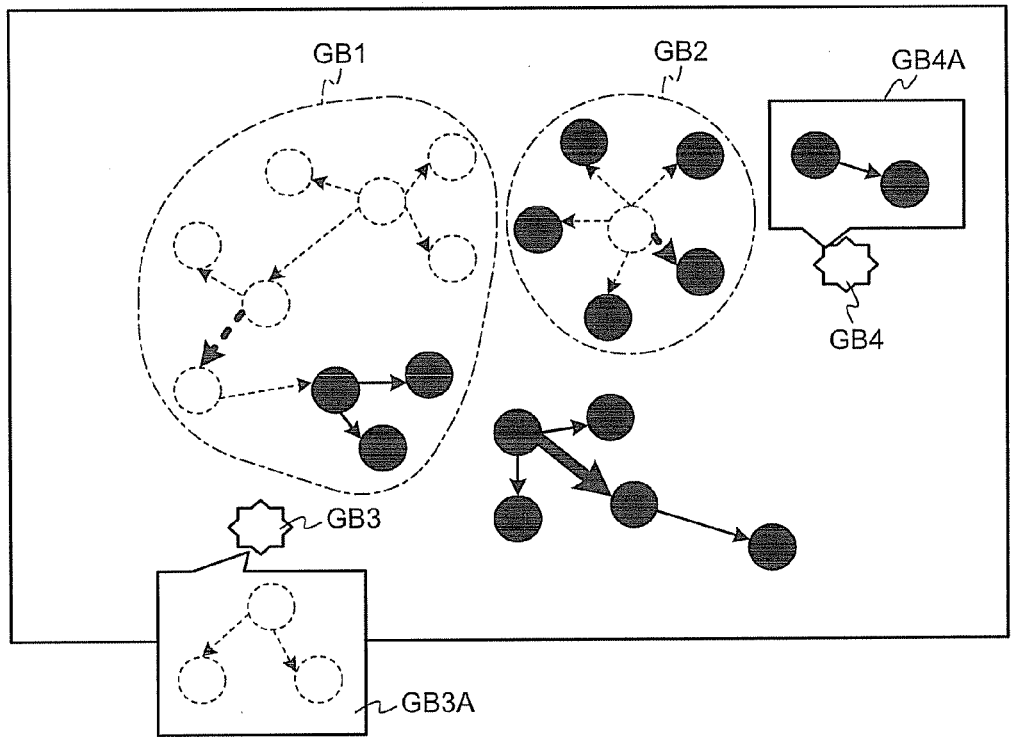
FIG. 12 is an example of the display data displayed on the display unit according to the second embodiment.

At Step SA2, the display-data generating unit 104 generates the display data with the size of the change point specified by the change-point identifying unit 105 larger than other points. At the same time, the display-data generating unit 104 determines to display a group of nodes that receive the same evaluation, i.e., evaluation of positive or negative collectively as a single mark. FIG. 12 is an example of such display data displayed on the display unit. An area GB1 includes the point that has the strong influence on the reputation and the point at which the reputation changes from negative to positive, showing that a lot of opinions were given, in which most opinions were negative at first, and then positive opinions increased. An area GB2 includes the point that has the strong influence on the reputation and the point at which the reputation changes from negative to positive, which is assumed to include rebuttals, a barrage of criticism, and a flame war. Areas GB3 and GB4 does not include any change point. In the areas GB3 and GB4, a plurality of nodes of the same kind of reputation, i.e., only one of positive or negative reputation is displayed by a single mark. The display-data generating apparatus 100' can be configured to generate the display data so that a detailed graph of the linkages among the nodes is displayed when the user selects the area GB3 or GB4, using balloons GB3A and GB4A or the like.

As explained above, by the display-data generating apparatus 100' displaying the change point in the larger size instead of displaying all the nodes in the same size, the user can easily recognize the point at which the reputation greatly changes. Therefore the user can easily recognize how the reputation changes during the propagation from website to website.

Alternatively, the display-data generating unit 104 can be configured to generate the display data separately, which includes the first marks of the nodes and the second marks of the linkages in the change point so that the change point is displayed in a separate window, instead of enlarging the size of the change point identified by the change-point identifying unit 105.

A third embodiment of the present invention is explained below. The explanation of the configuration identical to the first embodiment or the second embodiment is not repeated, and the same reference numerals are used as in the first embodiment and the second embodiment.

Figure 13:
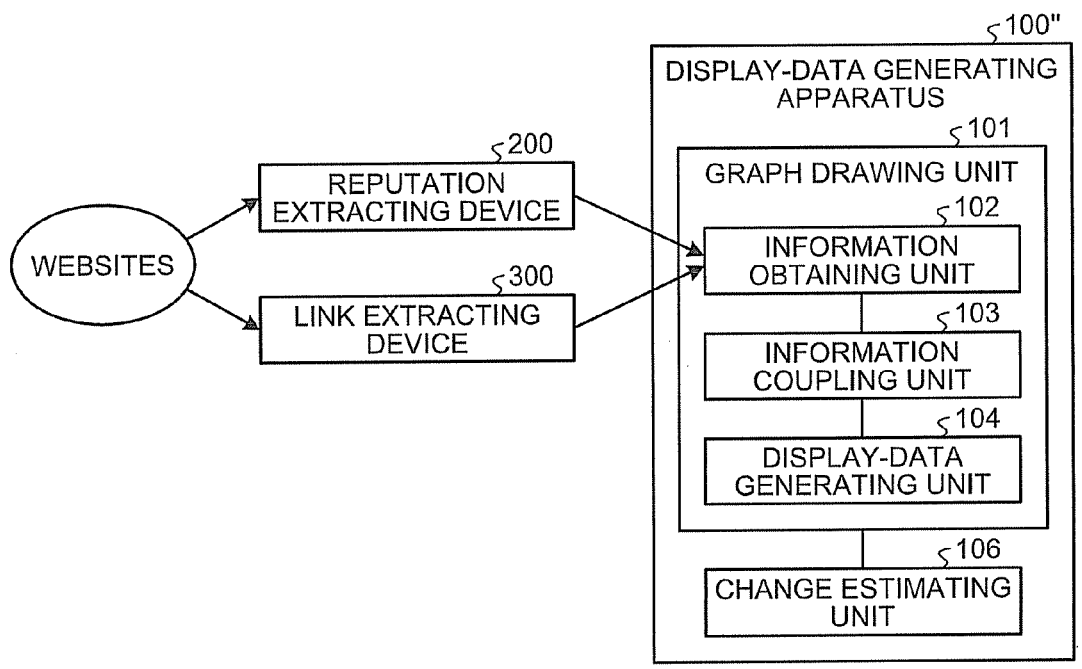
FIG. 13 is a block diagram of a display-data generating apparatus according to a third embodiment of the present invention.

FIG. 13 is a block diagram of a display-data generating apparatus 100" according to the third embodiment. The configuration of the display-data generating apparatus 100" is different from the display-data generating apparatus 100 according to the first embodiment in the following aspects. In addition to the graph drawing unit 101, the display-data generating apparatus 100" further includes a change estimating unit 106. The change estimating unit 106 analyzes the temporal change of the reputation included in the reputation linkage information obtained by the information coupling unit 103, thereby estimating the future reputation after a predetermined time period. The display-data generating unit 104 determines the display mode of the first marks of the nodes and the second marks of the linkages based on the future reputation estimated by the change estimating unit 106. The reputation information obtained by the information obtaining unit 102 includes the date information explained in the first embodiment.

Figure 14:
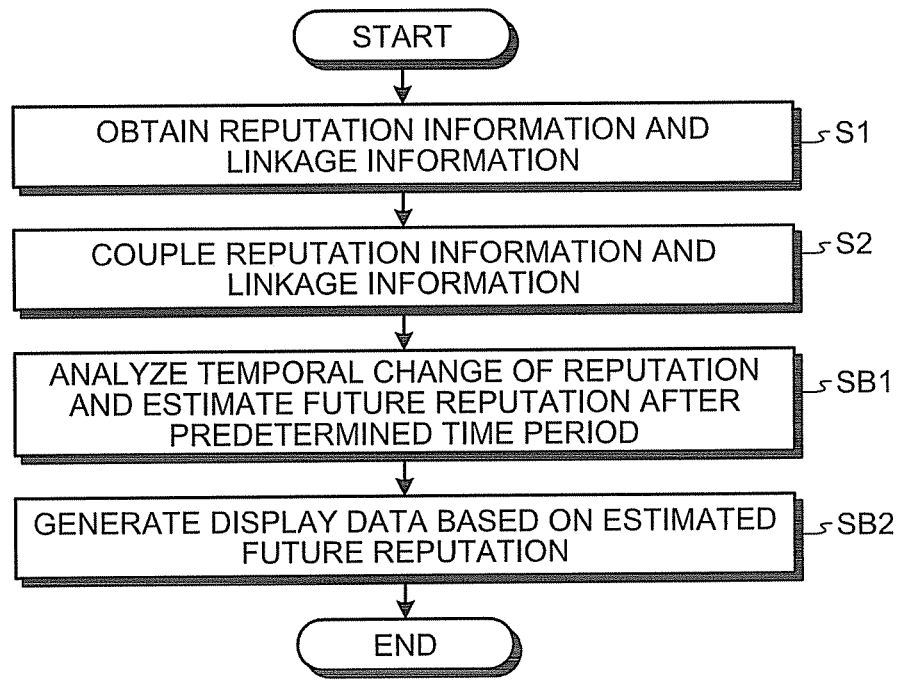
FIG. 14 is a flowchart of a display-data generating process according to the third embodiment.

A display-data generating process performed by the display-data generating apparatus 100" is explained with reference to FIG. 14. Steps S1 and S2 are same as in the first embodiment. At Step SB1, the change estimating unit 106 analyzes the temporal change of the reputation, thereby estimating the future reputation after the predetermined time period. More specifically, the change estimating unit 106 analyzes the change of the reputation during the propagation in the past including the increase and decrease of the nodes, change of proportion of the positive data and the negative data, the change of the proportion of appearance of the viewpoints, using the reputation linkage information, and computes the average changed portion of them. Using the computed changed portion, the change estimating unit 106 estimates the changed portion in a certain time period, such as a week, from the present time, thereby estimating the future reputation in a week. For example, when the number of nodes changes functionally as the time passes, the change estimating unit 106 can obtain a prediction expression that expresses the function such as a linear function and a quadratic function, and assign the certain time period to the prediction expression, thereby estimating the future reputation after the certain time period.

Figure 15:
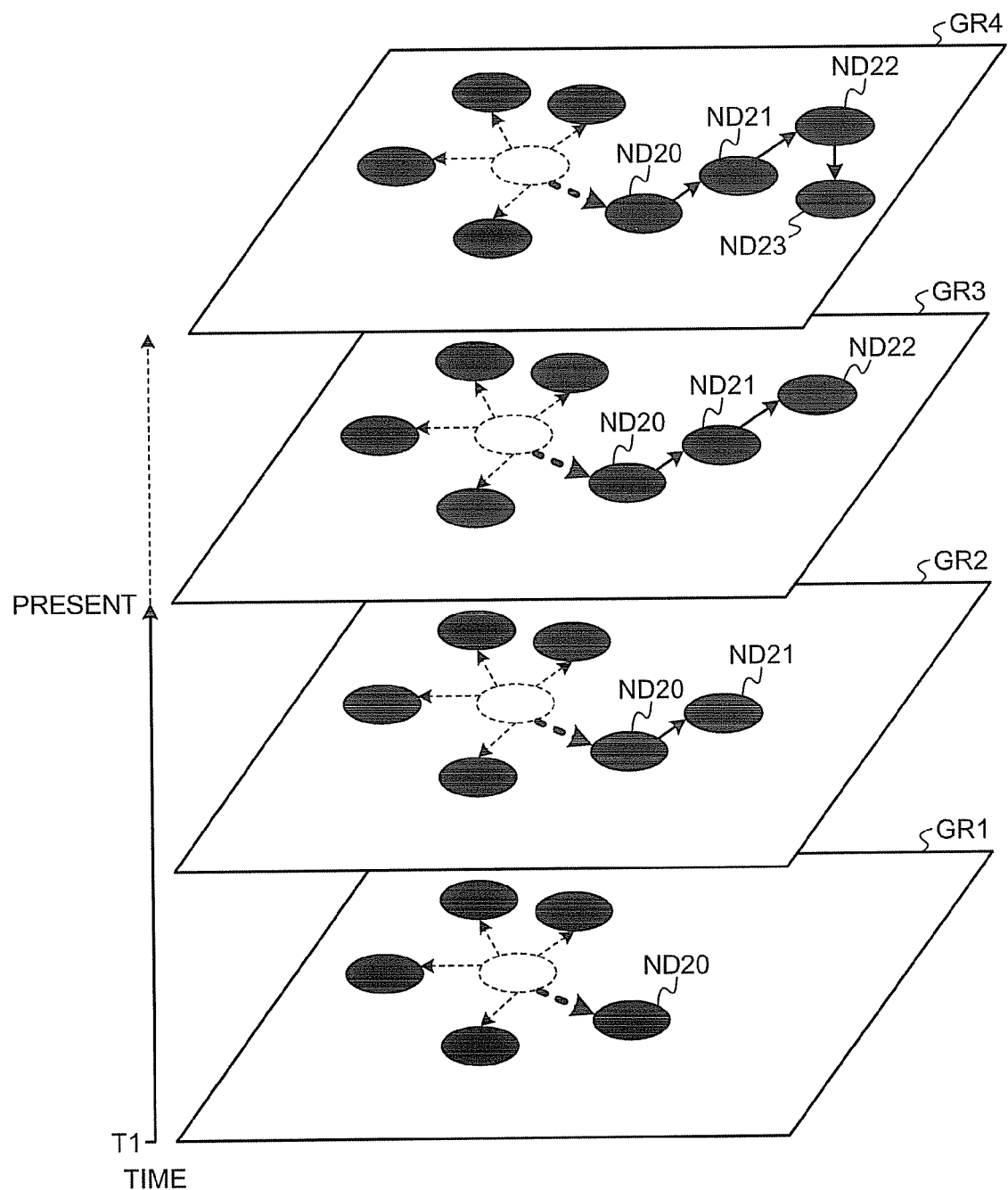
FIG. 15 is an example of the display data displayed on the display unit according to the third embodiment.

The display-data generating unit 104 determines the display mode of the first marks of the nodes and the second marks of the linkages based on the future reputation estimated by the change estimating unit 106 to generate the display data. For example, when the change estimating unit 106 estimates that the number of the nodes indicative of the positive data starting from a predetermined node will increase, the display-data generating unit 104 generates the display data that includes the first mark of the predetermined node and the second marks of the linkages between the predetermined node and other nodes. At this time, the display-data generating unit 104 associates the display data generated based on the estimated future reputation with a single layer, and also associates the reputation linkage information used for the analysis performed by the change estimating unit 106 at each time period after the predetermined time point with each layer, thereby generating the display data with respect to each layer using the reputation linkage information. When such display data with respect to each layer is displayed on the display unit, for example, a screen as shown in FIG. 15 is displayed on the display unit. In FIG. 15, each of layers GR1, GR2, and GR3 indicates a graph generated using the reputation linkage information at each time period after the predetermined time point T1, and a layer R4 indicates the display data generated based on the future reputation estimated by the change estimating unit 106. The reputation propagates from a node symbolized by ND20 in the layer GR1 to a node symbolized by ND21 in the layer GR2, and it further propagates from the node ND21 to a node symbolized by ND22 in the layer GR3. It is also estimated that the reputation propagates from the node ND22 to a node symbolized by ND23 in the layer GR4. In this manner, the user can easily recognize the propagation of the reputation in the temporal order and the estimation of the reputation in the future.

Although display-data generating apparatus 100" is configured to generate the display data based on the reputation in the past in association with the layer at each time period used for the analysis performed by the change estimating unit 106, the display-data generating apparatus 100" can be configured to generate only the display data based on the future reputation estimated by the change estimating unit 106.

Furthermore, the display-data generating unit 104 can be configured to generate the display data based on the future reputation estimated by the change estimating unit 106 in response to a direction input to specify a time period of display.

When the reputation information includes the location information explained in the first embodiment, the change estimating unit 106 can be configured to analyze the change of geographical distribution of the reputation using the location information, thereby estimating the distribution of the reputation in the future. In this case, the display-data generating unit 104 arranges the nodes according to the physical locations on the map, as in the first embodiment, to show the distribution of the reputation in the future.

The display-data generating apparatus 100" can be configured to include the change-point identifying unit 105 explained in the second embodiment, so that the change estimating unit 106 analyzes the temporal change of the reputation at the change point identified by the change-point identifying unit 105, thereby estimating the future reputation.

Programs executed by the display-data generating apparatuses 100, 100', and 100" can be stored in a computer connected via a network, such as the internet, so that the programs are provided by downloading via the network. Otherwise, the programs can be recorded in a computer readable recording medium, such as a compact disk read only memory (CD-ROM), a flexible disk (FD), a compact disk readable (CD-R), and a digital versatile disk (DVD), in an installable or executable format. In this case, the programs are loaded into the storing unit, such as the RAM, by the display-data generating apparatuses 100 reading the programs from the recording medium and executing them, thereby generating the units explained above in the storing unit.

Although the information obtaining unit 102 is configured to obtain the reputation information from the reputation extracting device 200 in the embodiments explained above, the information obtaining unit 102 can be configured to obtain the reputation information from, for example, a recording medium that stores therein the reputation information. The information obtaining unit 102 can be configured to obtain the linkage information in the same manner.

Although the information coupling unit 103 is configured to use the URL to couple the reputation information with the linkage information in the embodiments explained above, the information coupling unit 103 can be configured to use, for example, any information including the article number, n internet protocol (IP) address, and the like.

In the embodiments explained above, the display data generated by the display-data generating unit 104 can be transmitted to another information processing device that includes the display unit via the network, or recorded in the recording medium to be provided to the other information processing device that includes the display unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A display-data generating apparatus comprising:
   a memory having computer executable instructions stored therein; and a processor communicatively coupled to the memory, the processor configured to facilitate execution of the computer readable instructions, the computer executable instructions, comprising:

obtaining reputation information indicative of reputation of a specific subject, the reputation information being extracted from a text of websites accessible via a network, the reputation information including at least viewpoint information being indicative of a standpoint from which the subject is evaluated, and degree information being indicative of a degree of the reputation from the viewpoint indicated by the viewpoint information;

obtaining linkage information indicative of a linkage between the texts;

coupling the reputation information and the linkage information, by obtaining the linkage between the texts associated with the reputation information specified from each of the texts;

determining a display mode of a first mark that symbolizes the text of websites and a second mark that symbolizes the linkage according to the viewpoint information and the degree information included in the reputation information corresponding to the text;

generating a display data to display the first mark and the second mark with the display mode determined in the determining; and displaying the first mark and the second mark with the display mode determined in the determining on the display device, wherein the reputation information further includes date information indicative of a date; and the determining further determines a display position of the first mark so that first marks are radiated in all directions in a temporal order, the first mark corresponding to the reputation information with an older date indicated by the date information being positioned closer to a center of the display area.

2. The apparatus according to claim 1, wherein
the determining further determines at least one of a color, a color density, a thickness, the display position, and a display size as a display mode of the first mark and the second mark according to the viewpoint information and the degree information included in the reputation information associated with the text.

3. The apparatus according to claim 2, wherein
the reputation information includes first degree information indicative of a degree of positive reputation and second degree information indicative of a degree of negative reputation; and
the determining further determines colors of first marks so that a color of the first mark that symbolizes the text corresponding to the reputation information of which the degree indicated by the first degree information is higher than the degree indicated by the second degree information is different from the color of the first mark that symbolizes the text corresponding to the reputation information of which the degree indicated by the first degree information is lower than the degree indicated by the second degree information.

4. The apparatus according to claim 2, wherein
the determining further determines colors of second marks so as to be colors that vary with respect to each viewpoint indicated by the viewpoint information.

5. The apparatus according to claim 2, wherein the determining further determines at least one of a color, a color density, and a line thickness of the second mark according to the degree of the reputation indicated by the degree information.

6. The apparatus according to claim 1, wherein the generating further generates the display data including characters indicative of the viewpoint.

7. The apparatus according to claim 1, wherein
the determining further determines to display only first marks corresponding to the reputation information including the viewpoint information indicative of a predetermined viewpoint.

8. The apparatus according to claim 1, wherein
the reputation information further includes location information indicative of a location of an author of the text, and
the determining further determines a display position of the first mark corresponding to the reputation information according to a physical location of the location indicated by the location information on a map.

9. The apparatus according to claim 1, wherein
the reputation information further includes author information that identifies an author of the text, and
the determining further determines a display mode of the first mark so that a plurality of first marks indicative of texts posted by a same author are overlapped being displaced little by little.

10. The apparatus according to claim 9, wherein
the computer executable instructions further comprise receiving direction input by a user; and
the determining further determines whether the texts posted by the same author is to be symbolized by a single first mark or a plurality of the first marks.

11. The apparatus according to claim 1, wherein
the computer executable instructions further comprise receiving a direction input by a user; and
the determining further determines, when the receiving receives a direction that specifies a time period, to display only first marks corresponding to the reputation information including the date information indicative of the date within the time period specified by the direction, and further determines a display position of the first mark, according to the date indicated by the date information in the reputation information corresponding to the first mark.

12. The apparatus according to claim 1, wherein
the coupling further couples the reputation information and the linkage information based on the date indicated by the date information, by obtaining the linkage between the texts associated with the reputation information with respect to each time period;
the determining further determines a display mode of the first mark and a display mode of the second mark according to the viewpoint information and the degree information included in the reputation information associated with the text; and
the generating further generates the display data including the first mark and the second mark in different layers with respect to each time period.

13. The apparatus according to claim 1, wherein
the computer executable instructions further comprise identifying the texts and a linkage between the texts if a change of the reputation between the texts satisfies a predetermined condition; and the determining further determines to make first marks that symbolize the texts identified in the identifying and the second mark that symbolizes the linkage between the texts larger than other first marks and other second marks.

14. The apparatus according to claim 1, wherein
the reputation information includes first degree information indicative of a degree of positive reputation and second degree information indicative of a degree of negative reputation; and
the determining further determines to express first marks that symbolize the texts associated with the reputation information including the degree indicated by the first degree information higher than the degree indicated by the second degree information or first marks that symbolize the texts associated with the reputation information including the degree indicated by the first degree information lower than the degree indicated by the second degree information by a third mark.

15. The apparatus according to claim 1, wherein
the computer executable instructions further comprise analyzing a temporal change of the reputation in the linkage between the texts associated with the reputation information based on date information included in the reputation information to estimate future reputation indicative of the reputation in the linkage between the texts after a predetermined time period; and
the determining further determines a display mode of the first mark and the second mark based on the future reputation estimated in the estimating.

16. The apparatus according to claim 1, wherein
the reputation information and the linkage information include access information to access the text via the network; and
the coupling further includes coupling the reputation information and the linkage information including same access information, by generating reputation linkage information indicative of the linkage between the texts associated with the reputation information specified by each of the texts.

17. The apparatus according to claim 1, wherein
the computer executable instructions further comprise displaying the display data generated in the generating.

18. The apparatus according to claim 1, wherein
the specific subject further comprises a commercial product name.

19. A display-data generating method comprising:
firstly obtaining, by a system that includes a processor, reputation information indicative of reputation of a specific subject, the reputation information being extracted from a text of websites accessible via a network, the reputation information including at least viewpoint information being indicative of a standpoint from which the subject is evaluated, and degree information being indicative of a degree of the reputation from the viewpoint indicated by the viewpoint information;
secondly obtaining, by the system, linkage information indicative of a linkage between the texts;
coupling, by the system, the reputation information and the linkage information, by obtaining the linkage between the texts associated with the reputation information specified from each of the texts;
determining, by the system, a display mode of a first mark that symbolizes the text of websites and a second mark that symbolizes the linkage according to the viewpoint information and the degree information included in the reputation information corresponding to the text;
generating, by the system, a display data to display the first mark and the second mark with the display mode determined in the determining; and
displaying, by the system, the first mark and the second mark with the display mode determined in the determining on a display device, wherein
the reputation information further includes date information indicative of a date; and
the determining further determines a display position of the first mark so that first marks are radiated in all directions in a temporal order, the first mark corresponding to the reputation information with an older date indicated by the date information being positioned closer to a center of the display data.

20. The apparatus according to claim 19, wherein
the specific subject further comprises a commercial product name.

* * * * *